A. A. FESGUET.
METHOD OF PURIFYING ACETIC ACID.
No. 44,053. Patented Aug. 30, 1864.
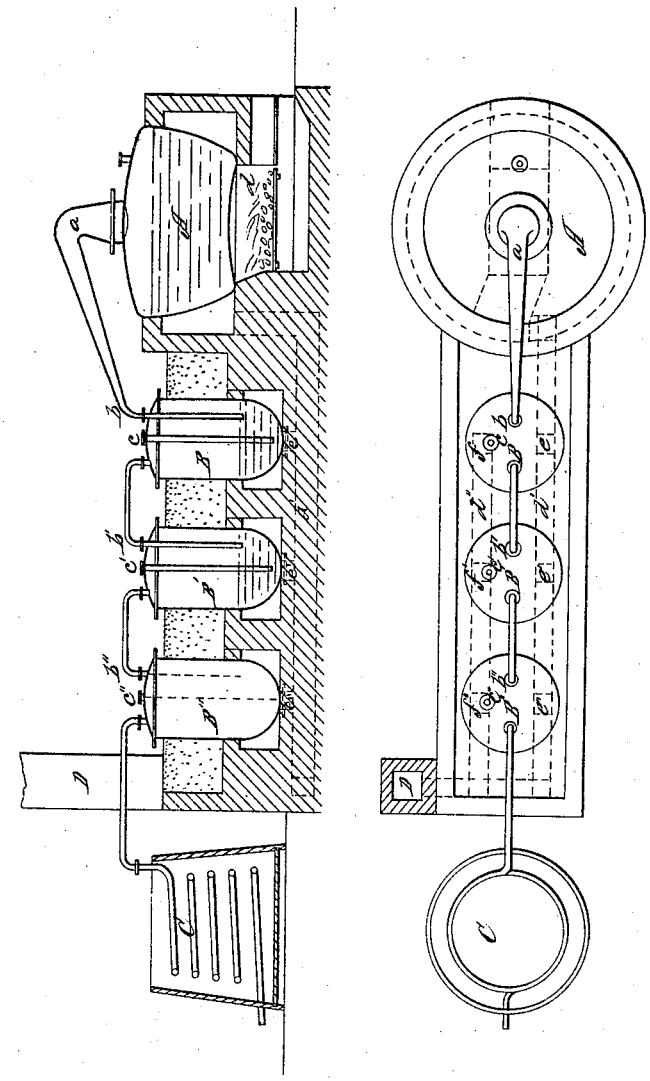
Witnesses:
Inventor:

UNITED STATES PATENT OFFICE.

ADOLPHE AMEDEI FESQUET, OF MARSEILLES, FRANCE.

IMPROVED METHOD FOR PURIFYING ACETIC ACID.

Specification forming part of Letters Patent No. 44,053, dated August 30, 1864.

*To all whom it may concern:*

Be it known that I, ADOLPHE AMEDEI FESQUET, of Marseilles, France, have invented a new and useful method for the purification of impure or crude acetic acid, no matter from what source it may have been obtained; and I do hereby declare that the following is a full and exact description thereof.

My invention consists of a process for producing pure acetic acid from the so-called "pyroligneous acid" or any other impure acetic acid. For this purpose I distill the crude acids and allow their vapors to pass through sulphuric acid heated to a point somewhat above that of the ebullition of the impure acid, while by the action of the sulphuric acid acetic acid is not affected, the substances which are the cause of the bad odor of the so-called "pyroligneous" or any other impure acetic acid, and of its coloration, are more or less completely destroyed. The vapors of the refined acetic acid pass through the sulphuric acid and may be condensed in any convenient apparatus. For a complete purification of the acetic acid it is advisable to pass the vapors before their condensation through several vessels containing sulphuric acid, (two, three, or more may be employed with advantage,) and finally through another vessel containing a solution of acetate of soda or acetate of lime, likewise heated above the boiling-point of the acetic acid. The latter or any other substance which has a similar action will retain the small quantities of sulphuric acid mechanically carried over with the vapors of acetic acid, and also the minute quantity of sulphurous acid resulting from the decomposition of sulphuric acid by its action upon the impurities.

This process may be carried out in any convenient apparatus; but I give in the annexed drawing that which I employ and by which it may be speedily and continuously carried on. I do not, however, intend to claim it or any other apparatus as part of or as essential to my invention.

The said drawing contains a vertical section and a horizontal projection of this apparatus, similar parts being marked with similar letters of reference.

A is a still, made of copper, in which the crude acetic acid is first distilled. The steam of it passes through the goose's neck $a$, made of copper, and the pipe $b$, made of lead, which dips about one inch in the sulphuric acid put at the bottom of the vessel B, and thence through the pipe $b'$ in the similar vessel B'. The acetic acid purified by the sulphuric acid passes then in the vessel B'', which contains some acetate of lime, or of soda, where it leaves the small quantity of sulphuric and sulphurous acids carried over with the vapors. The acetic acid thus purified is then condensed in the cooling-worm $c$. The dipping-pipes $b\ b'$ $c\ c'$ are of lead, the latter being intended to be used as safety-tubes large enough to introduce into them a siphon-tube to draw out the impurities and again fill the vessels with fresh sulphuric acid. The dipping-tubes $b''$ $c''$, intended for the same purpose, are made of block-tin. The vessels B B' B'' are kept somewhat above the point of ebullition of the acetic acid by the lost heat of the fire $d$, which passes through the flues $d'\ d''$ before going out by the chimney D.

With the dampers the heat may be regulated and directed to pass under each vessel through the connecting-flues $e\ e'\ e''$ and $f\ f'\ f''$.

The purified acetic acid thus produced may be employed for the manufacture of table vinegar, and for that of various chemicals of which it is a compound, such as acetates of lead, copper, &c., the manufacture of so called "white lead," &c. It may be also concentrated into acetic acid of any desirable degree of strength by methods usually employed for that purpose.

Having now described the nature of my said invention, and the manner of performing the same, I claim as my invention—

The purification of crude pyroligneous or impure acetic acid by the destructive action of sulphuric acid upon the impurities therein contained, substantially as set forth in the above specification.

ADOLPHE AMEDEI FESQUET.

Witnesses:
C. B. HELFENSTEIN,
J. E. SHAW.